W. E. PETERSON.
COMBINED SAW SET AND CLAMP.
APPLICATION FILED APR. 20, 1914.
1,166,929.
Patented Jan. 4, 1916.
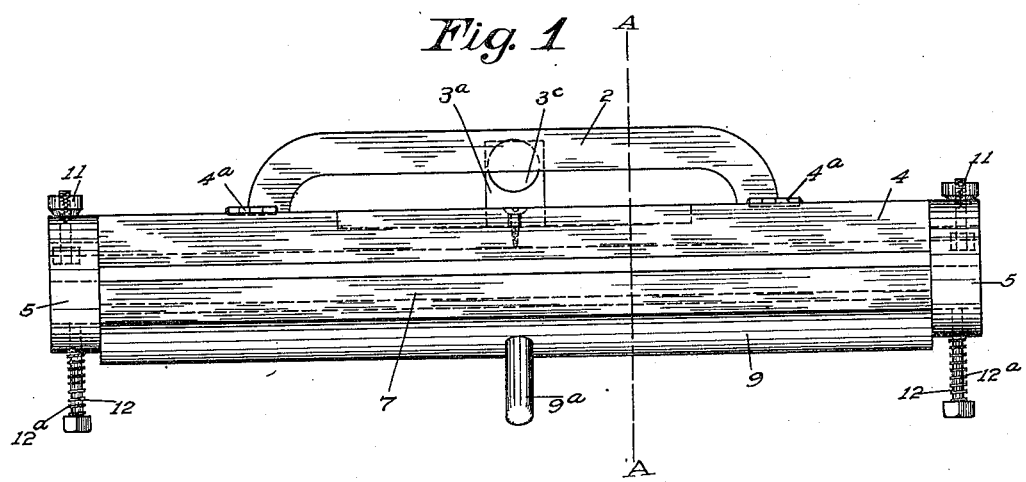
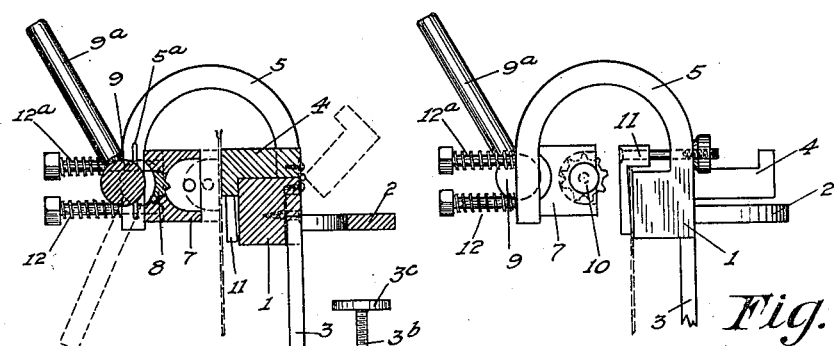
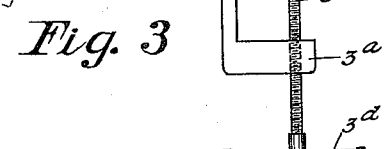
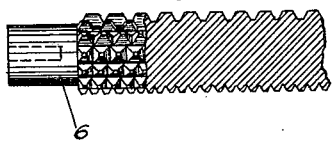
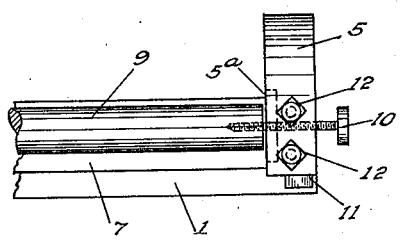
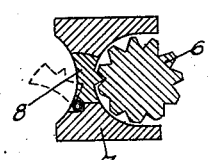
Witnesses
Grove E Herrmann
Elmer E. Rodabaugh
Inventor
WALTER E. PETERSON
by T. B. Bowman
Attorney

UNITED STATES PATENT OFFICE.

WALTER E. PETERSON, OF SAN DIEGO, CALIFORNIA.

COMBINED SAW SET AND CLAMP.

1,166,929.  Specification of Letters Patent.  Patented Jan. 4, 1916.

Application filed April 20, 1914. Serial No. 833,054.

*To all whom it may concern:*

Be it known that I, WALTER E. PETERSON, a citizen of the United States, and a resident of San Diego, in the county of San Diego and State of California, have invented certain new and useful Improvements in Combined Saw Sets and Clamps, of which the following is a specification.

My invention relates to a device for setting the teeth in saws, more particularly carpenters' hand saws and for clamping the saw blade for filing the teeth of said saws. The objects of my invention are, first, to provide a device of this class which will set a large number of saw teeth at a time; second, to provide a device of this kind with means for setting saws of various numbers of teeth to the inch; third, to provide such a device which requires but little changing to provide a clamp or vise to hold the saw for filing purposes, and fourth, to provide such a device that is simple, economical of construction, durable and easily operated.

With these and other objects in view as will appear hereinafter, my invention consists of certain novel features of construction, combination and arrangement of parts, as will be hereinafter described in detail and particularly set forth in the appended claims, reference being had to the accompanying drawings and to the characters of reference thereon, which form a part of this specification, in which:

Figure 1 is a top or plan view of my device complete; Fig. 2 is an end view thereof showing the saw blade in position; Fig. 3 is a sectional view through A—A of Fig. 1, showing by dotted lines the various positions of some of the parts; Fig. 4 is a detailed fragmentary view of one end of my device at right angles to that of Fig. 1; Fig. 5 is a fragmentary view of my saw setting roll; Fig. 6 is an end view thereof, and Fig. 7 is a detailed sectional view showing the saw setting roll and means for holding it in position when setting the saw.

Similar characters of reference refer to similar parts throughout the several views.

The main support 1, bench plate 2, bench clamp 3, saw clamp piece 4, end supports 5, saw setting roll 6, roll support 7, guide 8, eccentric bar 9, screws 10, saw holding clamp 11, and spring bolts 12, constitute the principal parts of my device.

The main support 1 is a longitudinal bar extending the length of the device. It is provided on one side with the bench plate 2 which extends outwardly therefrom and is shaped as shown best in Figs. 1 and 3. Pivotally mounted on this main support 1 is the bench clamp 3 which extends downwardly and is L-shaped and is provided with a projecting portion $3^a$ adapted to project immediately beneath the bench plate 2. Into this portion $3^a$ is screwed the bolt $3^b$ which is provided with a disk on its one end $3^c$ and with a handle $3^d$ reciprocally mounted therein in its other end. This is for the purpose of clamping the edge of a bench, table or the like between the bench plate 2 and the disk $3^c$, thus rigidly supporting the device on the edge of a bench, table or the like. Mounted on each end of the supporting piece 1 is an end support 5 which is U-shaped as shown best in Figs. 2 and 3. Mounted on the other member of this U-shaped piece, opposite to the supporting piece 1, is the saw setting roll support 7 by means of two bolts 12 extending through said member of said piece 5 and rigidly secured to the roll support 7. These bolts are provided with compression springs $12^a$ tending to hold the supporting piece 7 against the inner surface of one member of the piece 5, and allowing it to be pressed away from it by compressing the springs $12^a$. This supporting piece 7 is provided with a groove adapted for the saw setting roll 6, allowing one side to protrude therefrom a short distance. In order to keep the saw setting roll 6 in certain torsional relation to this supporting piece there is provided a guide piece 8 which is pivotally mounted thereon and provided with a V-shaped portion which fits between two of the projecting members on the saw setting roller 6 and holds it in certain relative position. The eccentric roller 9 is mounted on each of its ends on pins which are secured eccentrically thereto and are mounted in slots $5^a$ in the end pieces 5, which allow the pins in the ends of said eccentric roll to move longitudinally therein and the roll conform to the groove in the surface of the supporting piece 7. This eccentric roller is provided with a handle $9^a$ adapted to facilitate its torsional movement whereby the supporting piece is carried toward the main support 1 carrying with it the saw setting roll 6, and when the saw is placed in certain relative position on the support 1 and clamped there by means of the clamp 11, the projections on the roll 6 engage with the teeth of the saw and bend them in proper position. Mounted on the main support 1 by means of hinges 4ª is the clamp piece 4, which extends longitudinally with the support and is adapted to be hinged on said support and moved into certain positions, as shown best in Fig. 3 by the solid and dotted lines. When it is in the position as shown by solid lines in Fig. 3, the saw may be clamped into position for filing, the roll 6 having been removed by the removal of the screws 10 and the roller removed from the recess in the support 7 and by the same movement of the eccentric roller 9, as hereinbefore described.

Though I have shown and described a particular construction, combination and arrangement of parts, I do not wish to be limited to this particular construction, combination and arrangement, but desire to include in the purview of my invention the construction, combination and arrangement substantially as set forth in the appended claims.

It is obvious that with this construction there is provided a device whereby several teeth of a saw may be readily set by one movement of the eccentric roller 9, then the saw may be moved along the roller and the remainder of the teeth set, then the blade turned over and the teeth on the other side set by the same movement, after which the setting roll may be readily removed by removing the bolts 10 in each end, and the clamp piece 4 moved on its hinges to the position shown by solid lines in Fig. 3, and the saw blades can be readily clamped for filing the teeth; that each row of projections on the roll 6 are made for setting saws with a different number of teeth to the inch, and the outer surface is of the proper shape to provide the proper bend to the tooth; that the clamps 11 will hold the saw in certain position relatively to the support 1, and the guide 8 will keep the roll 6 from turning, thus holding it in the proper position to properly set the teeth of the saw; that the device is readily changeable from a setting device to a clamping device and vice versa; that the device is simple, durable, economical of construction, and easily operated.

Having thus described my invention, what I claim as new and desire to secure by Letters Patent, is:

1. In a device of the class described, the combination of a supporting frame consisting of a bar, another bar mounted adjacent thereto and adapted to be moved to said bar, eccentric means engaging therewith adapted to move the same, means mounted in said movable bar adapted for engaging with a plurality of teeth of a saw for bending the same, and a bar hinged on said first mentioned bar adapted to engage with said movable bar for clamping a saw blade.

2. In a device of the class described, the combination of a frame, a clamping member hinged thereto, a movable member adapted to engage with said hinged member, a saw set roller adapted for setting the teeth in a variety of kinds of saws detachably mounted in said movable member, means for holding it in certain position therein, and eccentric means for moving said movable member.

3. In a device of the class described, the combination of a frame, a clamping member hinged thereto, a movable member adapted to engage with said hinged member, a saw set roller adapted for setting the teeth in a variety of kinds of saws detachably mounted in said movable member, means for holding it in certain position therein, eccentric means for moving said movable member, and means for clamping said frame to a bench or the like.

In testimony whereof, I have hereunto subscribed my name in the presence of two subscribing witnesses.

WALTER E. PETERSON.

Witnesses:
 ABRAM B. BOWMAN,
 MINNIE KORTE.